(12) United States Patent
Tang

(10) Patent No.: US 11,052,538 B2
(45) Date of Patent: Jul. 6, 2021

(54) SELF-MOVING ROBOT, MAP BUILDING METHOD, AND MAP INVOKING METHOD FOR COMBINED ROBOT

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 254 days.

(21) Appl. No.: 16/303,100

(22) PCT Filed: May 19, 2017

(86) PCT No.: PCT/CN2017/085017
§ 371 (c)(1),
(2) Date: Nov. 19, 2018

(87) PCT Pub. No.: WO2017/198207
PCT Pub. Date: Nov. 23, 2017

(65) Prior Publication Data
US 2019/0168386 A1 Jun. 6, 2019

(30) Foreign Application Priority Data
May 19, 2016 (CN) .......................... 201610334640.5

(51) Int. Cl.
*B25J 5/00* (2006.01)
*B25J 9/16* (2006.01)
(Continued)

(52) U.S. Cl.
CPC ............. *B25J 9/1666* (2013.01); *B25J 5/007* (2013.01); *B25J 11/0085* (2013.01);
(Continued)

(58) Field of Classification Search
CPC ...... B25J 9/1666; B25J 5/007; B25J 11/0085; G01S 17/89; G01S 5/14; G01S 7/003;
(Continued)

(56) References Cited

U.S. PATENT DOCUMENTS 9,182,763 B2 11/2015 Park et al.
2002/0153184 A1 10/2002 Song et al.
(Continued)

FOREIGN PATENT DOCUMENTS

CN 101430207 A 5/2009
CN 102359784 A 2/2012
(Continued)

OTHER PUBLICATIONS

European Search Report in Application No. 17798770.8 dated Nov. 11, 2019.
(Continued)

*Primary Examiner* — Dalena Tran
(74) *Attorney, Agent, or Firm* — Maschoff Brennan

(57) ABSTRACT

The self-movement robot includes a robot body and a control center disposed on the body. The body includes a first distance sensor disposed in a horizontal direction used to collect two-dimensional map information and a second distance sensor disposed in a vertical direction used to collect spatial height information. While obtaining the two-dimensional map information of a working surface, the control center overlays the spatial height information to the two-dimensional map information and obtains three-dimensional map information of a working region. Through the distance sensors disposed on the self-movement robot, based on the generated two-dimensional map, the spatial height information is overlaid and the three-dimensional map information is generated. In a combined state, the robot invokes and plans a walking path in the working region based on the
(Continued)

three-dimensional map, thereby helping to ensure smooth, safe and efficient operation of the combined robot in a complex environment.

14 Claims, 2 Drawing Sheets

(51) Int. Cl.
G05D 1/02 (2020.01)
G01C 21/32 (2006.01)
B25J 11/00 (2006.01)

(52) U.S. Cl.
CPC .............. G01C 21/32 (2013.01); G05D 1/02 (2013.01); G05D 1/0238 (2013.01); G05D 1/0274 (2013.01); G05D 2201/0203 (2013.01); G05D 2201/0207 (2013.01)

(58) Field of Classification Search
CPC ...... G01C 21/32; G01C 21/206; G01C 21/34; G01C 23/00; G05D 1/02; G05D 2201/0203; G05D 2201/0207
USPC ........ 700/245, 255, 253, 258; 345/419, 156, 345/634; 15/340.1; 382/153, 224; 701/23, 36
See application file for complete search history.

(56) References Cited

U.S. PATENT DOCUMENTS

| 2007/0100498 | A1 | 5/2007 | Matsumoto et al. |
| 2008/0184518 | A1* | 8/2008 | Taylor ..................... A47L 9/009 15/319 |
| 2009/0006480 | A1* | 1/2009 | Fuchs .................. G01C 21/367 |
| 2009/0216501 | A1* | 8/2009 | Yeow ..................... G06T 15/20 703/1 |
| 2012/0019627 | A1* | 1/2012 | Choi .................... G05D 1/0246 348/50 |
| 2017/0195775 | A1 | 7/2017 | Morris et al. |

FOREIGN PATENT DOCUMENTS

| CN | 105091884 A | 11/2015 |
| EP | 2058720 A2 | 5/2009 |
| EP | 2058720 B1 | 1/2014 |
| JP | 2014157478 A | 8/2014 |
| WO | 2010/114235 A1 | 10/2010 |

OTHER PUBLICATIONS

CN Office Action in Application No. 20160334640.5 dated May 14, 2019.

* cited by examiner

SELF-MOVING ROBOT, MAP BUILDING METHOD, AND MAP INVOKING METHOD FOR COMBINED ROBOT

FIELD

The present disclosure relates to a self-movement robot, a map building method, and a map invoking system for a combined robot.

BACKGROUND

A self-movement robot may be used for its convenient control and flexible action. For some self-movement robots, such as an integrated combined robot, the height may be limited to a certain degree. In the walking process of the self-movement robot, if the height of an obstacle is less than the height of the body of the self-movement robot, then the self-movement walk of the robot is hindered and the self-movement robot cannot pass through the obstacle smoothly.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Description of Example Embodiments. This Summary is not intended to identify key features or essential characteristics of the claimed subject matter, nor is it intended to be used as an aid in determining the scope of the claimed subject matter.

In the present disclosure, a self-movement robot, a map building method, and a map invoking system for a combined robot is provided in view of the defects of other applications. For example, through distance sensors disposed on the self-movement robot, based on a generated two-dimensional map, spatial height information may be overlaid and three-dimensional map information may be generated. Additionally or alternatively, in a combined state, the robot invokes and plans a walking path in a working region based on a three-dimensional map, thereby ensuring smooth, safe and efficient operation of the combined robot in a complex environment.

In these or other embodiments of the present disclosure, a self-movement robot includes, for example, a robot body and a control center disposed on the body, wherein the robot body includes a first distance sensor disposed in a horizontal direction and a second distance sensor disposed in a vertical direction. In these or other embodiments, the first distance sensor collects two-dimensional map information of a working surface in which the self-movement robot is located. Additionally or alternatively, the second distance sensor collects spatial height information above the working surface in which the self-movement robot is located; and while obtaining the two-dimensional map information of the working surface, the control center overlays the spatial height information to the two-dimensional map information and obtains three-dimensional map information of a working region.

In these or other embodiments, the first distance sensor and the second distance sensor may include an ultrasonic sensor, an infrared sensor and/or a visual sensor. Additionally or alternatively, the spatial height information above the working surface is a distance from the working surface to a lower surface of an encountered obstacle.

The present disclosure also provides a map building method for the above self-movement robot, including the following example steps: step 100: generating two-dimensional map information of a working surface; and step 200: collecting spatial height information above the working surface in real time and overlaying the spatial height information to the two-dimensional map information of the working surface to obtain and save three-dimensional map information of a working region.

In these or other embodiments, the two-dimensional map information in the step 100 is obtained by the self-movement robot traversing, walking and scanning the working surface. Additionally or alternatively, the spatial height information above the working surface in the step 200 is a distance from the working surface to a lower surface of an encountered obstacle.

An example process of overlaying the spatial height information to the pre-generated two-dimensional map information may include: step 201: the self-movement robot walking in the working region, recording a coordinate of a discrete point N1 as (x1, y1), simultaneously (or approximately simultaneously) detecting a spatial height above the point N1 as h1, and then recording a three-dimensional coordinate of a highest point M1 of the space above the discrete point N1 as (x1, y1, h1); step 202: the self-movement robot continuing to walk, and continuing to record three-dimensional coordinates of highest points M2 to Mn of the spaces above discrete points N2 to Nn until the self-movement robot completes a traversal and walk in the working region; and step 203: fitting spatial information from a surface fitted by the discrete points N1 to Nn to a surface fitted by the points M1 to Mn into three-dimensional map information and saving in memory (e.g., of a storage unit). In these or other embodiments, a three-dimensional map of the working region is built according to the three-dimensional map information saved in the step 203.

In some embodiments, a map invoking system for a combined robot is provided or utilized. The combined robot includes a self-movement robot and a functional module combined and connected with the self-movement robot. The self-movement robot is provided with a storage unit and the two-dimensional map information and the three-dimensional map information of the working region configured to be stored in the storage unit.

In some embodiments, the combined robot includes an uncombined mode and a combined mode. When the self-movement robot works individually or alone, the combined robot is in the uncombined mode; and when the self-movement robot is combined and connected with the functional module, the combined robot is in the combined mode.

In the uncombined mode, the self-movement robot invokes the two-dimensional map information and conducts a walking operation on a two-dimensional working surface.

In the combined mode, the combined robot invokes the three-dimensional map information and conducts a walking operation on a three-dimensional working region. For example, in the combined mode, the combined robot plans a walking path according to the three-dimensional map information and computes a walkable working region.

Additionally or alternatively, the combined robot computes: map information of a first plane P1 according to body height L and the three-dimensional map information. In these or other embodiments, a height difference between the first plane P1 and the working surface is the body height L of the combined robot. Additionally or alternatively, the combined robot plans the walking path according to the two-dimensional map information of the first plane P1.

Thus, in some embodiments, the present disclosure provides a self-movement robot, a map building method, and a map invoking system for a combined robot. In the present disclosure, through the distance sensors disposed on the self-movement robot, based on the generated two-dimensional map, the spatial height information is overlaid and the three-dimensional map information is generated; and in the combined state, the robot invokes and plans the walking path in the working region based on the three-dimensional map, thereby helping to ensure smooth, safe and efficient operation of the combined robot in a complex environment.

The technical solution of the present disclosure is described below in detail in combination with drawings and specific embodiments.

DESCRIPTION OF EXAMPLE EMBODIMENTS

Figure 1:
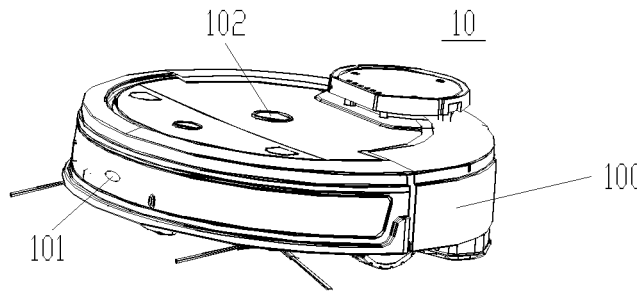
FIG. 1 is an example structural schematic diagram of a self-movement robot provided by an embodiment of the present disclosure.

FIG. 1 is an example structural schematic diagram of a self-movement robot. As shown in FIG. 1, the self-movement robot 10 includes a robot body 100 and a control center (not shown in the figure) disposed on the body 100, wherein the robot body 100 includes a first distance sensor 101 disposed in a horizontal direction and a second distance sensor 102 disposed in a vertical direction. In these or other embodiments, the first distance sensor 101 collects two-dimensional map information of a working surface W in which the self-movement robot is located; and the second distance sensor 102 collects spatial height information above the working surface W in which the self-movement robot is located. Additionally or alternatively, while obtaining the two-dimensional map information of the working surface W, the control center overlays the spatial height information to the two-dimensional map information and obtains three-dimensional map information of a working region. Additionally or alternatively, for a point A, two-dimensional map information is (x1, y1) and the spatial height information is h1, the combining, by the control center, the spatial height information with the two-dimensional map information to obtain three-dimensional map information of a working region may be a process of combining the (x1, y1) and h1 to obtain (x1, y1, h1) as three-dimensional map information. Additionally or alternatively, the first distance sensor 101 and the second distance sensor 102 include an ultrasonic sensor, an infrared sensor and/or a visual sensor. For example, the spatial height information above the working surface W is a distance from the working surface to a lower surface of an encountered obstacle in an up-down direction.

Figure 2:
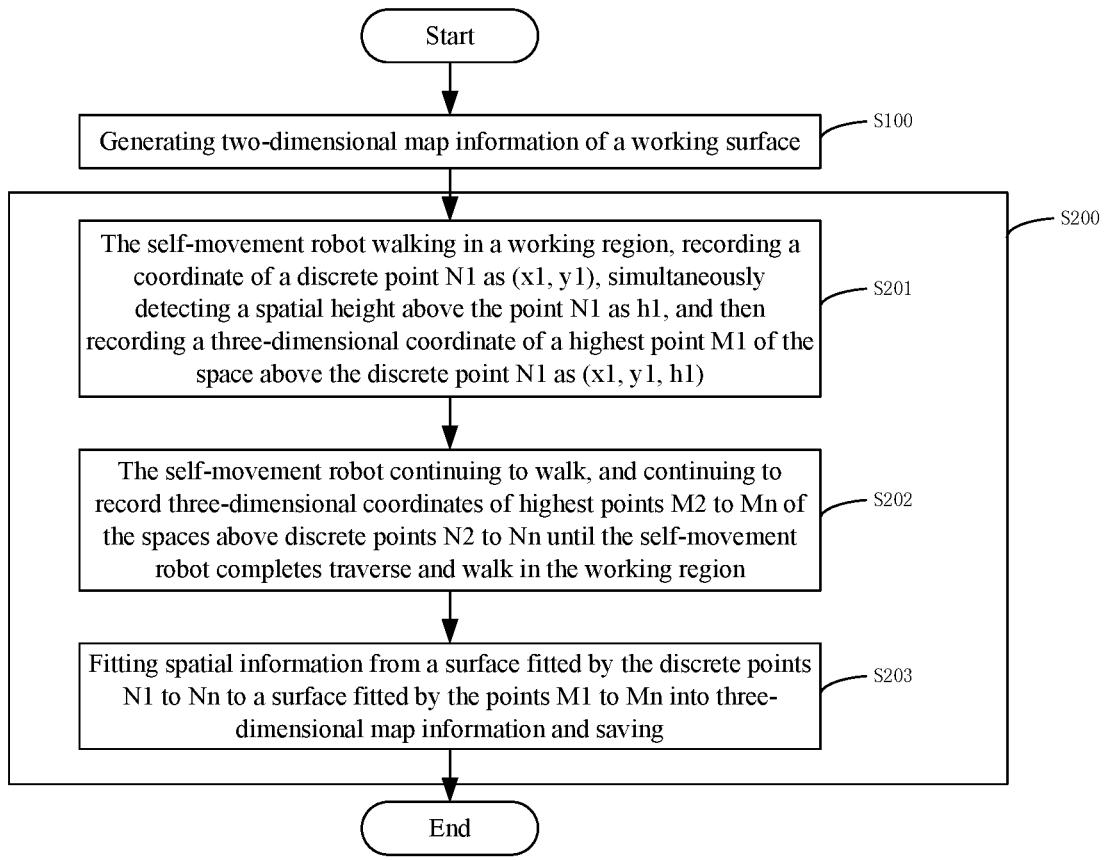
FIG. 2 is a simplified flow chart of a three-dimensional map building method for a self-movement robot provided by an embodiment of the present disclosure.

FIG. 2 is a simplified flow chart of a three-dimensional map building method for a self-movement robot. As shown in FIG. 2, a map building method for the self-movement robot provided in the embodiment as mentioned above includes the following example steps: step 100: generating two-dimensional map information of a working surface; and step 200: collecting spatial height information above the working surface in real time and overlaying the spatial height information to the two-dimensional map information of the working surface to obtain and save three-dimensional map information of a working region (in other words, obtain the three-dimensional map information of a working region and save the obtained three-dimensional map information of a working region).

Additionally or alternatively, the two-dimensional map information in the step 100 is obtained by the self-movement robot traversing, walking and scanning the working surface. Additionally or alternatively, the traversing walk is a operation or a process that the self-moving robot walks in the in a working region and walks all through the in the working region (in other words, traverses the in the working region). In these or other embodiments, the spatial height information above the working surface in the step 200 is a distance from the working surface to a lower surface of an encountered obstacle in an up-down direction.

An example process of overlaying the spatial height information to the pre-generated two-dimensional map information may include: step 201: the self-movement robot walking in the working region, recording a coordinate of a discrete point N1 as (x1, y1), simultaneously (or approximately simultaneously) detecting a spatial height above the point N1 as h1, and then recording a three-dimensional coordinate of a highest point M1 of the space above the discrete point N1 as (x1, y1, h1); step 202: the self-movement robot continuing to walk, and continuing to record three-dimensional coordinates of highest points M2 to Mn of the spaces above discrete points N2 to Nn until the self-movement robot completes a traversal and walk in the working region; and step 203: fitting spatial information from a surface fitted by the discrete points N1 to Nn to a surface fitted by the points M1 to Mn into three-dimensional map information and saving. In these or other embodiments, a three-dimensional map of the working region is built according to the three-dimensional map information saved in the step 203.

Figure 3:
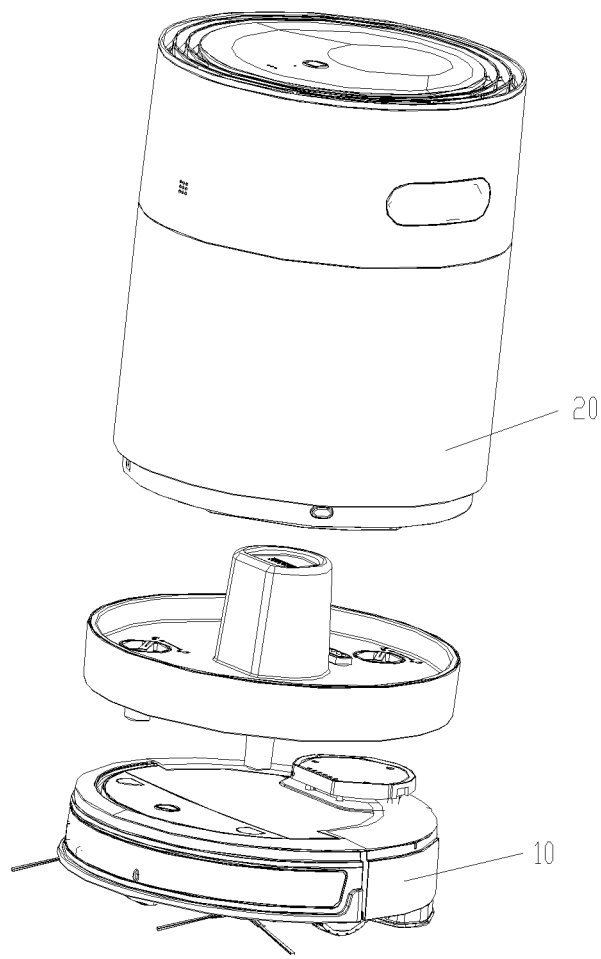
FIG. 3 is an example structural schematic diagram of a combined robot provided by an embodiment of the present disclosure.

FIG. 3 is an example structural schematic diagram of a combined robot. As shown in FIG. 3, the combined robot A includes the above self-movement robot 10 and a functional module 20 integrated on the self-movement robot, wherein the self-movement robot includes, for example, a cleaning robot, a transporting robot or a walking robot capable of working individually. In one embodiment of the present disclosure, the self-movement robot 10 is a sweeping robot. Additionally or alternatively, the functional module 20 may be one submodule or a combination of more submodules of a security module, a humidifying module and a purifying module.

In these or other embodiments, the present disclosure includes a map invoking system for a combined robot. The combined robot A includes a self-movement robot 10 and a functional module 20 combined and connected with the self-movement robot. The self-movement robot 10 is provided with a storage unit (not shown in the figure), and the two-dimensional map information and the three-dimensional map information of the working region are stored in the storage unit. The combined robot A includes two working modes, such as an uncombined mode and a combined mode. When the self-movement robot 10 individually works, the combined robot is in the uncombined mode; and when the self-movement robot 10 is combined and connected with the functional module 20, the combined robot is in the combined mode. In the uncombined mode, the self-movement robot 10 invokes the two-dimensional map information and conducts a walking operation on a two-dimensional working surface W. Additionally or alternatively, for a wiping robot, conducting the walking operation may conduct wiping operation well walks in a working region. In the combined mode, the combined robot 10 invokes the three-dimensional map information and conducts a walking operation in a three-dimensional working region.

For example, in the combined mode, the combined robot A plans a walking path according to the three-dimensional map information and computes a walkable working region. A method for planning the walking path may include: the combined robot computing a plane map with a height L from the ground according to body height L and the three-dimensional map; and the combined robot planning the walking path according to the plane map. Additionally or alternatively, the method may further include a step of determining whether the self-moving robot of the combined robot 10 is combined and connected with the functional module, when the self-moving robot is not combined and connected with the functional module, the self-moving robot works individually (that is the combined robot is in the uncombined mode), and when the self-moving robot is combined and connected with the functional module, the self-moving robot works not individually (that is the combined robot 10 is in the combined mode).

Figure 4:
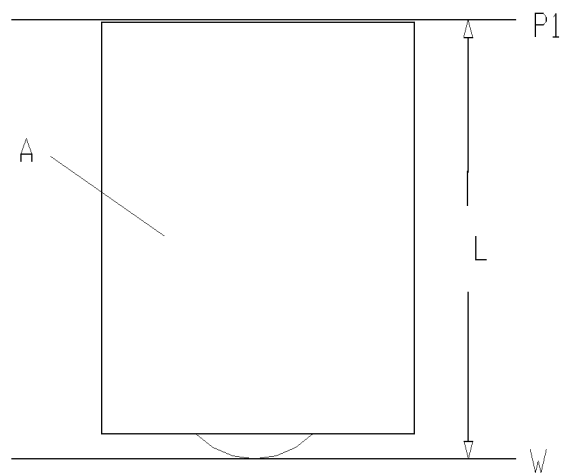
FIG. 4 is an example schematic diagram of a walking state of a combined robot provided by an embodiment of the present disclosure on a working surface.

FIG. 4 is a schematic diagram of a walking state of a combined robot of the present disclosure on a working surface. As shown in FIG. 4, for example, the combined robot computes map information of a first plane P1 according to the body height L and the three-dimensional map information. In these or other embodiments, a height difference between the first plane P1 and the working surface W is the body height L of the combined robot. Additionally or alternatively, the combined robot plans the walking path according to the two-dimensional map information of the first plane P1.

As shown in FIG. 1 to FIG. 4, the actual working process of the embodiments of the present disclosure may be as follows:

As shown in FIG. 1, after the self-movement robot 10 walks and scans in the working environment to build a map or traverses, walks and records the coordinate information of the working plane to build a map, a two-dimensional map is formed in the control center of the self-movement robot 10. The formation process of the above two-dimensional map may be presented in other applications[SS1], and is not repeated herein. Additionally or alternatively, the self-movement robot 10 continues to traverse and walk in the working environment. During walking, the distance sensors collect the height information in the working environment in real time (or approximately real time) and transmit the height information to the control center. The control center overlays the height information to the pre-generated two-dimensional map to obtain a three-dimensional map and save the three-dimensional map into the control center.

In these or other embodiments, when the self-movement robot adopts the above mode of traversing, walking and recording the coordinate information of the working plane to build the map, the self-movement robot can simultaneously (or approximately simultaneously) record the spatial height information, e.g., when obtaining the two-dimensional information of the working plane, the self-movement robot can simultaneously (or approximately simultaneously) collect the three-dimensional information of the working region to complete the building of the three-dimensional map of the working region. When the combined robot, as shown in FIG. 3, is combined and connected, the height of the combined robot is higher than the height of the self-movement robot 10. Therefore, an original two-dimensional map may not be enough to be used as the basis for planning the walking path of the combined robot. For example, a position which could be smoothly passed previously by the self-movement robot 10 may become impassable due to the problem of the increased height of the combined robot. At this moment, the three-dimensional map may be invoked to plan the walking path of the combined robot.

As shown in FIG. 4, the body height of the self-movement robot 10 in the combined state is L. In the present embodiment, the combined robot computes map information of the first plane P1 with a height L away from the working plane W of the self-movement robot through the above three-dimensional map. The first plane P1 can be regarded as the walkable working plane of the combined robot, and the walking path of the combined robot is planned in the map of the first plane P1.

Thus, in some embodiments, the present disclosure provides a self-movement robot, a map building method, and a map invoking system for a combined robot. In the present disclosure, through the distance sensors disposed on the self-movement robot, based on the generated two-dimensional map, the spatial height information is overlaid and the three-dimensional map information is generated; and in the combined state, the robot invokes and plans the walking path in the working region based on the three-dimensional map, thereby helping to ensure smooth, safe and efficient operation of the combined robot in a complex environment. In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A self-movement robot, comprising:
a robot body and a control center disposed on the body, the robot body comprising a first distance sensor disposed in a horizontal direction and a second distance sensor disposed in a vertical direction, wherein:
the first distance sensor collects two-dimensional map information of a working surface on which the self-movement robot is located,
the second distance sensor collects spatial height information above the working surface on which the self-movement robot is located,
the control center obtains three-dimensional map information of a working region according to a coordinate of a discrete point forming the two-dimensional map information collected by the first distance sensor and the spatial height information of the discrete point collected by the second distance sensor, and
the three-dimensional map information is used to plan a walking path in the working region for the robot.

2. The self-movement robot of claim 1, wherein the first distance sensor and the second distance sensor comprise one or more of an ultrasonic sensor, an infrared sensor and a visual sensor.

3. The self-movement robot of claim 2, wherein the spatial height information above the working surface is a distance from the working surface to a lower surface of an encountered obstacle in an up-down direction.

4. A map invoking system comprising:
a self-moving robot of a combined robot invokes two-dimensional map information and conducts a walking operation on a two-dimensional working surface, when the self-moving robot works individually;
wherein the combined robot comprises the self-movement robot according to claim 1 and a functional module combined and connected with the self-movement robot; and
a storage unit configured to store the two-dimensional map information and three-dimensional map information of a working region.

5. The map invoking system of claim 4, further comprising:
determining whether the self-moving robot is combined and connected with the functional module;
when the self-moving robot is not combined and connected with the functional module, the self-moving robot works individually.

6. A map invoking method comprising:
a combined robot invokes three-dimensional map information and conducts a walking operation on a three-dimensional working region, when a self-moving robot of the combined robot is combined and connected with a functional module, wherein:
the combined robot including the self-moving robot according to claim 1 and the functional module combined and connected with the self-moving robot; and
a storage unit configured to store two-dimensional map information and the three-dimensional map information of a working region.

7. The map invoking method of claim 6, wherein when the self-moving robot of the combined robot is combined and connected with a functional module, the combined robot plans a walking path according to the three-dimensional map information and calculates a walkable working region.

8. The map invoking method of claim 6, wherein:
the combined robot determines map information of a walkable working plane of the combined robot according to body height of the combined robot and the three-dimensional map information; and
the combined robot plans the walking path according to the two-dimensional map information of the walkable working plane of the combined robot.

9. The map invoking method of claim 6, further comprising:
determining whether the self-moving robot is combined and connected with the functional module; and
when the self-moving robot is combined and connected with the functional module, the self-moving robot works not individually.

10. The map invoking method according to claim 6, wherein the combined robot conducts the walking operation on a three-dimensional working region according to the three-dimensional map information and a body height of the combined robot.

11. A map building method, comprising:
  step 100: generating two-dimensional map information of a working surface; and
  step 200: collecting spatial height information above the working surface in real time by obtaining three-dimensional map information of a working region according to a coordinate of a discrete point forming the two-dimensional map information and the spatial height information of the discrete point, and saving the three-dimensional map information.

12. The map building method of claim 11, wherein the two-dimensional map information in the step 100 is obtained by a self-movement robot traversing, walking and scanning the working surface.

13. The map building method of claim 12, wherein the spatial height information above the working surface in the step 200 is a distance from the working surface to a lower surface of an encountered obstacle in an up-down direction; and
  obtaining three-dimensional map information of a working region according to a coordinate of a discrete point forming the two-dimensional map information and the spatial height information of the discrete point, and saving the three-dimensional map information comprises:
  step 201: the self-movement robot walking in the working region, recording a coordinate of a discrete point N1 as (x1, y1), simultaneously detecting a spatial height above the point N1 as h1, and recording a three-dimensional coordinate of a highest point M1 of the space above the discrete point N1 as (x1, y1, h1);
  step 202: the self-movement robot continuing to walk, and continuing to record three-dimensional coordinates of highest points M2 to Mn of the spaces above discrete points N2 to Nn until the self-movement robot completes a traversal and walk in the working region; and
  step 203: obtaining spatial information from a surface fitted by the discrete points N1 to Nn to a surface fitted by the points M1 to Mn into three-dimensional map information and saving.

14. The map building method of claim 13, further comprising building a three-dimensional map of the working region according to the three-dimensional map information saved in the step 203.

\* \* \* \* \*